United States Patent
Yu et al.

(10) Patent No.: US 10,688,985 B2
(45) Date of Patent: Jun. 23, 2020

(54) SYSTEMS AND METHODS FOR IMPLEMENTING A PREEMPTIVE CONTROL FOR AN AUTONOMOUS VEHICLE TO IMPROVE RIDE QUALITY

(71) Applicant: Pony AI Inc., Grand Cayman (KY)

(72) Inventors: Xiang Yu, Santa Clara, CA (US);
Tiancheng Lou, Milpitas, CA (US);
Jun Peng, Fremont, CA (US); Nengxiu Deng, Fremont, CA (US); Jie Hou, Fremont, CA (US)

(73) Assignee: Pony AI Inc., Grand Cayman (KY)

( * ) Notice: Subject to any disclaimer, the term of this patent is extended or adjusted under 35 U.S.C. 154(b) by 44 days.

(21) Appl. No.: 16/009,723

(22) Filed: Jun. 15, 2018

(65) Prior Publication Data
US 2019/0381999 A1  Dec. 19, 2019

(51) Int. Cl.
*B60W 30/02* (2012.01)
*G05D 1/00* (2006.01)
*B60W 40/06* (2012.01)

(52) U.S. Cl.
CPC .......... *B60W 30/025* (2013.01); *B60W 40/06* (2013.01); *G05D 1/0088* (2013.01); *B60W 2420/52* (2013.01); *B60W 2552/00* (2020.02); *B60W 2556/00* (2020.02); *G05D 2201/0213* (2013.01)

(58) Field of Classification Search
CPC .............. B60W 30/025; B60W 40/06; B60W 2600/00; B60W 2420/52; B60W 2550/14; G05D 1/0088; G05D 2201/0213
See application file for complete search history.

(56) References Cited

U.S. PATENT DOCUMENTS

| | | | |
|---|---|---|---|
| 10,048,700 B1 * | 8/2018 | Curlander | G05D 1/0297 |
| 2017/0158191 A1 * | 6/2017 | Bills | B60W 30/025 |
| 2018/0346116 A1 * | 12/2018 | Kundu | B64C 39/024 |
| 2019/0019349 A1 * | 1/2019 | Dolgov | G07C 5/008 |
| 2019/0054922 A1 * | 2/2019 | Yalla | B60W 30/18163 |
| 2019/0220011 A1 * | 7/2019 | Della Penna | G05D 1/0088 |

* cited by examiner

*Primary Examiner* — Rodney A Butler
(74) *Attorney, Agent, or Firm* — Sheppard Mullin Richter & Hampton LLP (57) ABSTRACT

Systems, methods, and non-transitory computer-readable media are provided for implementing a preemptive control for an autonomous vehicle to improve ride quality. Data from one or more sensors onboard the autonomous vehicle can be acquired. A surface imperfection of a road can be identified from the data. A next action for the autonomous vehicle can be determined based on the surface imperfection. A signal can be outputted that causes the autonomous vehicle to act in accordance with the next action.

12 Claims, 8 Drawing Sheets

SYSTEMS AND METHODS FOR IMPLEMENTING A PREEMPTIVE CONTROL FOR AN AUTONOMOUS VEHICLE TO IMPROVE RIDE QUALITY

FIELD OF THE INVENTION

This disclosure relates to control of an autonomous vehicle. More particularly, this disclosure relates to techniques for implementing preemptive control for an autonomous vehicle to improve ride quality.

BACKGROUND

Self-driving vehicles, assisted-driving vehicles, and/or autonomous vehicles refer to a category of vehicles that can be operated with limited or no human interactions. These vehicles rely on information acquired from various sensors or sensor systems onboard the vehicles to make driving decisions that are based at least, in part, on control systems and/or algorithms. In general, these control systems tend to be reactive in nature, meaning, the control systems respond only after road conditions change. Such control systems may cause discomfort to passengers of the vehicles.

SUMMARY

Various embodiments of the present disclosure can include systems, methods, and non-transitory computer readable media configured to implement a preemptive control for a vehicle, such as an autonomous vehicle, to improve ride quality. Data from one or more sensors onboard the autonomous vehicle can be acquired. A surface imperfection of a road can be identified from the data. A next action for the autonomous vehicle can be determined based on the surface imperfection. A signal can be outputted that causes the autonomous vehicle to act in accordance with the next action.

In some embodiments, a size of the surface imperfection can be determined based on the data. The next action can be determined based on the size of the surface imperfection.

In some embodiments, data acquired from a LiDAR corresponding to the surface imperfection can be analyzed. The size of the surface imperfection can be determined based on the data acquired from the LiDAR.

In some embodiments, the next action based on the size of the surface imperfection can include one of directing the autonomous vehicle to accelerate or directing the autonomous vehicle to decelerate.

In some embodiments, a neighboring lane that is clear of moving vehicles can be determined. The next action can be determined based on the neighboring lane being clear of moving vehicles.

In some embodiments, one or more radars can be utilized to detect presence of moving vehicles in the neighboring lane.

In some embodiments, the next action based on the neighboring lane being clear of moving vehicles can include directing the autonomous vehicle to move into the neighboring lane.

In some embodiments, a preemptive control system is a feedforward control augmented with a feedback control.

In some embodiments, the one or more sensors onboard the autonomous vehicles include one or more LiDARs, one or more radars, and one or more cameras.

In some embodiments, the surface imperfection of the road includes at least one of a pothole, a sinkhole, or an uneven pavement.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Autonomous vehicles rely on various sensors and/or devices to acquire road information. Road information are processed in real time, or near real time, so the autonomous vehicles can make driving decisions in response to changing road conditions. The processing that occurs on the autonomous vehicles are performed at least, in part, based on control systems and/or algorithms onboard the autonomous vehicles. The control systems and/or algorithms work in conjunction with hardware of the autonomous vehicles (e.g., control modules, processing units, actuators, etc.) to effectuate control of the autonomous vehicles. In general, the majority of control systems and/or algorithms implemented in autonomous vehicles are based on closed-loop control systems. A closed-loop control system can regulate, direct, or control an output such that an input to the closed-loop control system equals to a setpoint of the control system.

In general, closed-loop control systems, or feedback controls, tend to be reactive to input changes. A feedback control does not react or respond until an input to the control deviates from a setpoint. Thus, under conventional approaches, feedback controls tend to be slow in responding to changing input. Further, in autonomous vehicles, the reactive nature of the feedback controls may cause substandard ride quality to passengers onboard the autonomous vehicles. For example, a speed control of an autonomous vehicle can be implemented as a feedback control. In this example, the autonomous vehicle is traveling at 65 miles per hour on a highway. Further, in this example, there is a pothole or a sinkhole on a road ahead. The autonomous vehicle hits the pothole and temporarily slows down. To maintain the vehicle speed at 65 miles per hour, the autonomous vehicle accelerates. Here, the autonomous vehicle does not accelerate, or otherwise take action, until the vehicle speed deviates from 65 miles per hour. This sequence of actions taken by the autonomous vehicle (e.g., hitting the pothole and accelerating thereafter) may create discomfort to passengers of the autonomous vehicle. As such, conventional approaches of controlling autonomous vehicles may result in harsh rides and more importantly, may cause passengers of the autonomous vehicle to avoid or to have second thoughts about riding in an autonomous vehicle.

A claimed solution rooted in computer technology overcomes problems specifically arising in the realm of computer technology. In various embodiments, systems, methods, and non-transitory computer readable media can be configured to acquire data from one or more sensors onboard an autonomous vehicle. A surface imperfection of a road can be identified from the data. A next action for the autonomous vehicle can be determined based on the surface imperfection. A signal can be outputted that causes the autonomous vehicle to act in accordance with the next action.

In various embodiments, autonomous vehicles may navigate through roads, streets, and/or terrains with limited or no human input. The word "vehicle" or "vehicles" as used in this specification includes vehicles that travel on ground (e.g., cars, trucks, bus, etc.), but may also include vehicles that travel in air (e.g., drones, airplanes, helicopters, etc.), vehicles that travel on water (e.g., boats, submarines, etc.). Further, "vehicle" or "vehicles" discussed in this specification may or may not accommodate one or more passengers therein.

In general, an autonomous vehicle can effectuate any control to itself that a human driver can on a conventional vehicle. For example, the autonomous vehicle can accelerate, brake, turn left or right, or drive in a reverse direction just as the human driver can on the conventional vehicle. The autonomous vehicle can also sense environmental conditions, gauge spatial relationships (e.g., distances between objects and itself), detect and analyze road signs just as the human driver. Moreover, the autonomous vehicle can perform more complex operations, such as parallel parking, parking in a crowded parking lot, collision avoidance, etc., without any human input.

Figure 1:
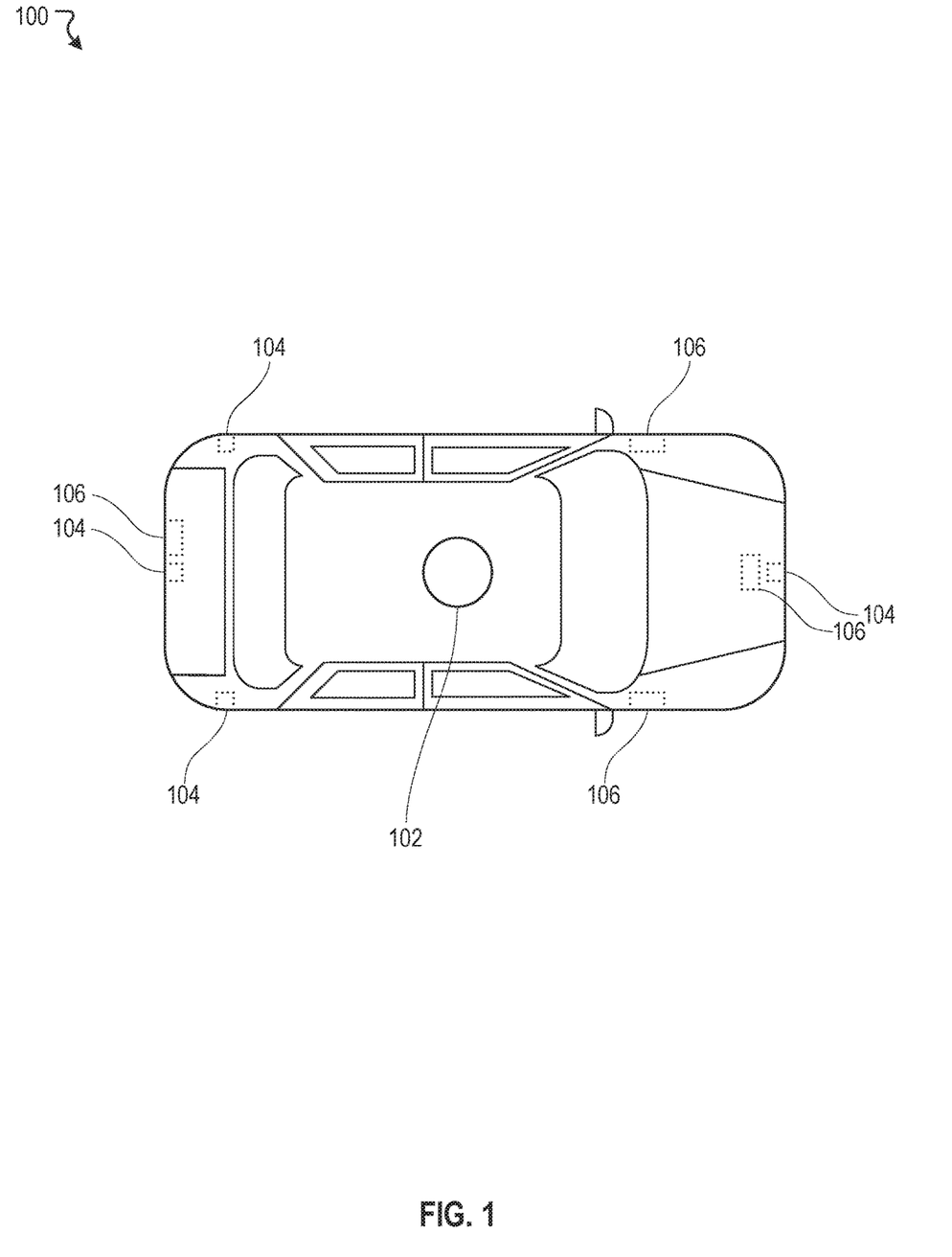
FIG. 1 illustrates an example autonomous vehicle, according to an embodiment of the present disclosure.

FIG. 1 illustrates an example autonomous vehicle 100, according to an embodiment of the present disclosure. The autonomous vehicle 100 can include a myriad of sensors (e.g., LiDARs, radars, cameras, etc.) to detect, identify, and track objects in an environment. Such objects may include pedestrians, road signs, traffic lights, for example. The autonomous vehicle 100 can also include a myriad of actuators to help the autonomous vehicle 100 navigate around the environment in response to the objects. Such actuators may include, for example, electro or electro-mechanical devices and/or systems to control throttle responses, brake actions, steering actions of the autonomous vehicle 100. In some embodiments, the autonomous vehicle 100 can recognize, interpret, or decipher road signs (e.g., speed limit, school zone, construction zone, etc.) and traffic lights (e.g., red light, yellow light, green light, flashing red light, etc.). For example, the autonomous vehicle 100 can adjust its speed in accordance with speed limits posted on roadways. In some embodiments, the autonomous vehicle 100 can determine and adjust speeds at which the autonomous vehicle 100 is traveling relative to other objects in the environment. For example, the autonomous vehicle 100 can maintain a constant, safe distance from a vehicle ahead (e.g., adaptive cruise control). In this example, the autonomous vehicle 100 maintains this safe distance by constantly adjusting its vehicle speed to that of the vehicle ahead.

In various embodiments, the autonomous vehicle 100 may include one or more sensors. As used herein, the one or more sensors may include a LiDAR 102, radars 104, cameras 106, and/or the like. The one or more sensors allow the autonomous vehicle 100 to sense an environment around the autonomous vehicle 100. For example, the LiDAR 102 can generate three dimensional maps of the environment. In some instance, the LiDAR 102 can be configured to detect, identify, and track objects in the environment. The radars 104 can determine relative distances and speeds of objects around the autonomous vehicle 100. In some embodiments, the radars 104 can be configured for adaptive cruise control and/or accident avoidance. For example, a front-side radar can be used by the autonomous vehicle 100 to maintain a safe distance from a vehicle ahead of the autonomous vehicle 100. In another example, if the vehicle ahead experiences a suddenly reduction in speed, the autonomous vehicle 100 can detect this sudden change and adjust its vehicle speed accordingly. In some embodiments, the radars 104 can be configured for blind-spot detection. The cameras 106 can capture and process image data to detect and identify objects, such as road signs, as well as interpreting or deciphering content of the objects, such as speed limits posted on the road signs. In some embodiments, a front-side and a back-side cameras can be configured to detect objects, such as cars, trucks, sports utility vehicles, pedestrian, road signs, in a front and a back of the autonomous vehicle 100. For example, the front-side camera can be utilized by the autonomous vehicle 100 to determine speed limits. In some embodiments, a right-side and a left-side cameras can be configured to detect objects, such as lane markers, on the sides of the autonomous vehicle 100. For example, the right-side and the left-side cameras can be used by the autonomous vehicle 100 to ensure that the autonomous vehicle 100 drives within its lane.

Figure 2:
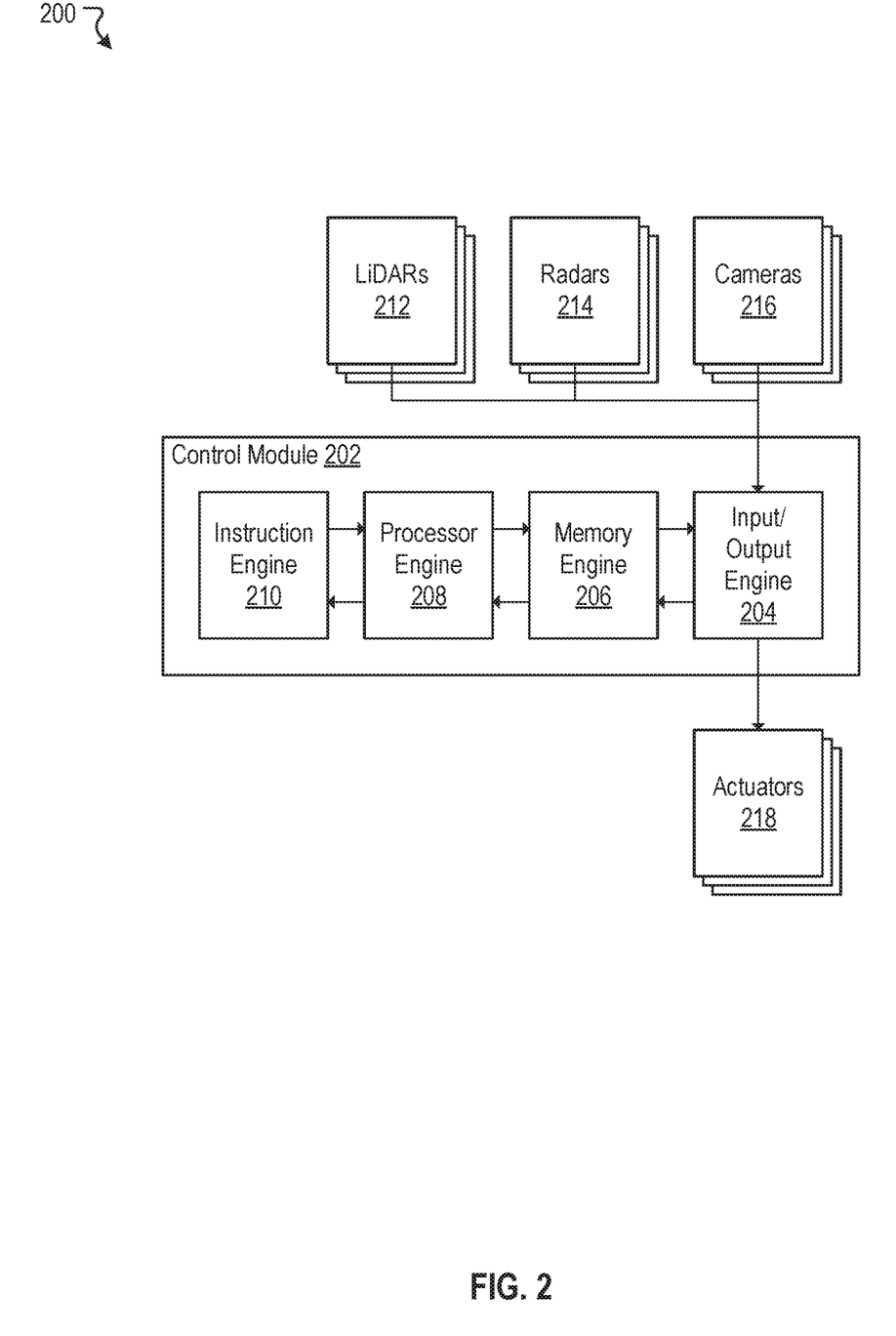
FIG. 2 illustrates an example autonomous vehicle control system, according to an embodiment of the present disclosure.

FIG. 2 illustrates an example autonomous vehicle control system 200, according to an embodiment of the present disclosure. In various embodiments, the autonomous vehicle control system 200 can include a control module 202, one or more LiDARs 212, one or more radars 214, one or more cameras 216, and one or more actuators 218. The one or more LiDARs 212, the one or more radars 214, and the one or more cameras 216 can be coupled to inputs of the control module 202. The one or more actuators 218 can be coupled to outputs of the control module 202. As discussed, the one or more LiDARs 212 can be configured to output three dimensional mapping data (e.g., point cloud data) to the control module 202. The one or more radars 214 can output distance and speed data of objects to the control module 202. The one or more cameras 216 can output image data to the control module 202. In some embodiments, the control module 202 can be configured to process various data acquired or obtained from the one or more LiDARs 212, the one or more radars 214, and the one or more cameras 216, make driving decisions (e.g., accelerate, brake, maintain current speed, turn right, turn left, yield, etc.) based on these processed data, and output one or more responses (e.g., actions to be taken by an autonomous vehicle) to the one or more actuators 218. In general, the one or more actuator 218 may be any electro or electro-mechanical devices or systems that enable an autonomous vehicle to take physical actions (e.g., throttle control, brake control, steering control, etc.) responsive to input changes. In some embodiments, the autonomous vehicle 100 in FIG. 1 can be controlled by the autonomous vehicle control system 200 of FIG. 2. Although in the example of FIG. 2, only one control module (e.g., the control module 202) is depicted, the autonomous vehicle control system 200 is not limited to just one such control module. In some embodiments, the autonomous vehicle control system 200 can include multiple control modules. For example, there can be a control module for each one of the sensors. Many variations are possible.

In some embodiments, the control module 202 can further include an input/output engine 204, a memory engine 206, a processor engine 208, and an instruction engine 210. The input/output engine 204 can be configured to interface with the inputs and the outputs of the control module 202. For example, the input/output engine 204 can be coupled to the one or more LiDARs 212, the one or more radars 214, and the one or more cameras 216 to acquire or obtain data from these sensors or sensor systems. The acquired data can be stored in the memory engine 206 to be later accessed by the processor engine 208. The input/output module 204 can also be coupled to the one or more actuators 218 to transmit control signals from the processor engine 208, via the memory engine 206, to the one or more actuators 218. In some embodiments, the memory engine 206 facilitates data transfer and data storage between the input/output engine 204 and the processor engine 208. In some embodiments, the processor engine 208 can be configured to process various data acquired from the inputs that are stored in the memory engine 206. For example, the processor engine 208 can process point cloud data acquired from the one or more LiDARs 212 to construct three dimensional maps of an environment. In another example, the processor engine 208 can process distance and speed data of objects in the environment obtained from the one or more radars 214 to determine their relative distances and speeds to an autonomous vehicle. In another example, the processor engine 208 can process image data from the one or more cameras 216 to detect, identify, and decipher objects captured in the image data. For instance, the processor engine 208 can, utilizing conventional imaging processing and object recognition/identification techniques, determine the objects captured in the image data are pedestrians, cyclists, moving vehicles, trees, road signs, etc. In some embodiments, the processor engine 208 can retrieve machine-readable instructions from the instruction engine 210 to process various data in accordance to various algorithms (e.g., control, machine learning, data analysis and visualization algorithms) embedded or stored in the instruction engine 210. For example, the processor engine 208, in conjunction with the instruction engine 210, can execute control algorithms tuned with specific control parameters to control the autonomous vehicle based on input conditions and in accordance to the control algorithms.

Figure 3A:
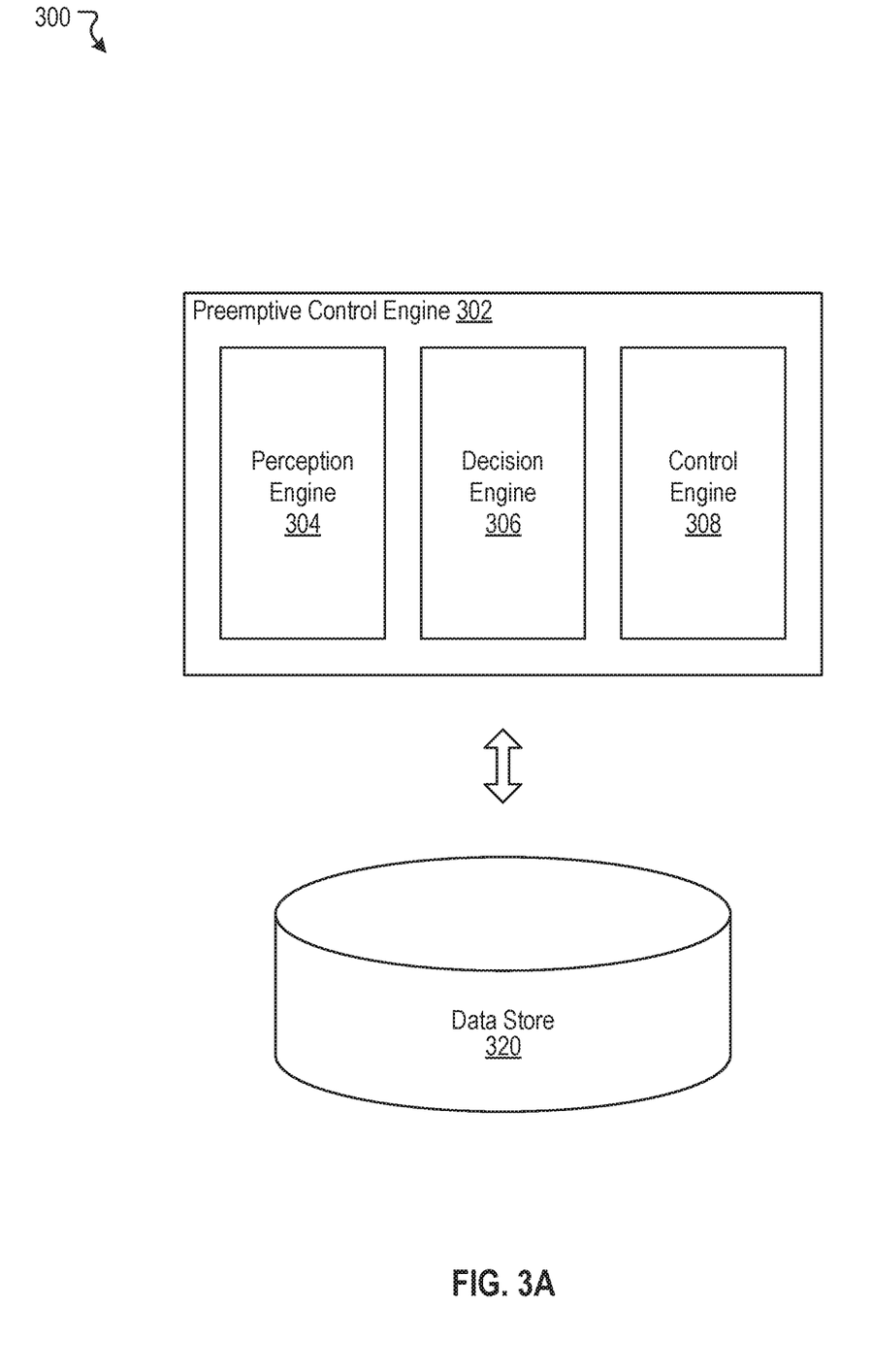
FIG. 3A illustrates an example preemptive control system, according to an embodiment of the present disclosure.

FIG. 3A illustrates an example preemptive control system 300, according to an embodiment of the present disclosure. In some embodiments, the example preemptive control system 300 can be implemented in a control module onboard an autonomous vehicle (e.g., the control module 202 of FIG. 2). The preemptive control system 300 can include at least a preemptive control engine 302 that includes one or more processors and memory. The processors can be configured to perform various operations associated with the preemptive control engine 302. In general, the preemptive control engine 302 can be implemented as a controller that anticipates input changes and outputs a control signal in response to the anticipated input changes before the input changes actually occur. As shown in FIG. 3A, in some embodiments, the preemptive control engine 302 can include a perception engine 304, a decision engine 306, and a control engine 308. In some embodiments, the preemptive control system 300 may also include at least one data store 320 that is accessible to the preemptive control engine 302. In some embodiments, the data store 320 can be configured to store parameter, data, or binary or machine-readable codes of the perception engine 304, the decision engine 306, and the control engine 308.

In various embodiments, the preemptive control engine 302 can be configured to control one or more operations of an autonomous vehicle. The one or more operations of the autonomous vehicle may include, but not limited to, acceleration, deceleration, and direction change. For example, the preemptive control engine 302 can control speed of the autonomous vehicle by outputting one or more control signals to one or more actuators that cause the autonomous vehicle to accelerate or decelerate based on speed limits posted on roadways. In another example, the preemptive control engine 302 can control steering of the autonomous vehicle by outputting one or more control signals to one or more actuators that cause the autonomous vehicle to change directions.

In some embodiments, the preemptive control engine 302 can be configured to preemptively or proactively control the one or more operations of the autonomous vehicle based on anticipated changes in road conditions. The preemptive or proactive aspect of the preemptive control engine 302 can be implemented as a feedforward control augmented by a feedback control. Such a control architecture may improve an overall response time of the preemptive control engine 302 by effectuating a change to the autonomous vehicle based on an anticipated change instead of waiting for the change to actually occur. Particularly, the feedforward control allows the preemptive control engine 302 to output a control signal to actuate the autonomous vehicle before the feedback control outputs the control signal. For example, a LiDAR onboard an autonomous vehicle may detects a pothole at some distance ahead. Instead of waiting for the feedback control to take action after the autonomous vehicle hits the pothole (e.g., temporary slowdown due to the pothole and subsequent acceleration to bring vehicle speed back to where it was), which may cause passenger discomfort, the feedforward control can output one or more control signals to preempt or anticipate the pothole to minimize passenger discomfort. For instance, when a size of the pothole exceeds some threshold size, the feedforward control may output a control signal that causes the autonomous vehicle to decelerate just prior to hitting the pothole. This action minimizes impact to passengers of the autonomous vehicle. When the size of the pothole does not exceed the threshold size, the feedforward control may output a control signal that causes the autonomous vehicle to accelerate just prior to hitting the pothole. This preemptive action taken by the autonomous vehicle improves ride quality for passengers of the autonomous vehicles. As such, impacts from the pothole can be preemptively minimized. Details are the feedback and feedforward control are discussed herein with reference to FIG. 3B below.

In some embodiments, under certain circumstances, the preemptive control engine 302 may perform more cognitive operations to optimize ride quality. For example, as with the example discussed above, the LiDAR detects a pothole at some distance ahead. In this example, the preemptive control engine 302 determines that neighboring lanes are free of moving vehicles. In this case, instead of driving through the pothole, which may cause discomfort to passengers, the preemptive control engine 302 may decide to change lanes to avoid hitting the pothole altogether. In another example, the preemptive control engine 302 determines that the pothole is located near lane markers (e.g., a side of a lane). In this example, instead of changing lanes, the preemptive control engine 302 may direct the autonomous vehicle to drive around the pothole. Details of the preemptive control engine 302 are discussed in further detail below.

In various embodiments, the perception engine 304 can be configured to detects, identify, and track objects in an environment around an autonomous vehicle. The objects can include pedestrians, moving vehicles, road signs, curvature of roads, and surface conditions of the roads, for example. The perception engine 304 can acquire data from sensors and/or sensor systems onboard the autonomous vehicle and derive information from the sensors and/or sensor systems. Such sensors and/or sensor systems can include, for example, LiDARs, radars, and cameras (e.g., LiDAR 102, radars 104, and cameras 106 of FIG. 1). In some embodiments, the perception engine 304 can interface with a LiDAR to acquire high fidelity three dimensional maps of an environment (e.g., point cloud data). The high fidelity three dimensional maps can include information regarding the objects in the environment and, in some cases, surface imperfections of roads. The surface imperfections can include potholes, sinkholes, uneven pavements, and/or elevations or dips, for example. In some embodiments, the surface imperfection does not include road conditions that are required to direct driving, such as traffic light, traffic signs (e.g., yield or stop sign) and turns. In some embodiments, the perception engine 304 can interface with radars to acquire object spatial information. For example, the perception engine 304, by using radars, can detect presence of moving vehicles in neighboring lanes and determine relative distances between the moving vehicles and the autonomous vehicle.

Surface imperfections, in some embodiments, refer to natural conditions of a road that are not designed by human to direct or impact operation of a vehicle. As noted above, traffic signs, intersections and speed bumps are examples of non-natural conditions used by human to direct vehicle operations. Potholes, sinkholes, uneven pavements, and elevations or dips, by contrast, occur naturally or are caused by damages, and are not designed by human. As such, such surface imperfections are generally not detected or monitored by vehicles, even autonomous vehicles. In some embodiments of the present disclosure, however, the systems and methods are configured to detect and/or monitor such conditions of the roads.

In some embodiments, the detection can be made by a radar or an image sensor. The detection, for instance, can also be carried out by an IMU (inertial measurement unit) which is configured to detect unevenness of a surface. In some instances, if the unevenness of a surface exceeds a threshold, which can be determined on the fly, per-determined by the system, or preset by a user, the vehicle can be slowed down to ensure comfort.

In some embodiments, the perception engine 304 can be configured to estimate relative sizes of the surface imperfections. For example, the perception engine 304 can determine the relative sizes of the surface imperfections based pulsed laser lights reflected off from the surface imperfections as measured by the LiDAR. In some embodiments, the perception engine 304 can also determine an inclination or declination of the roads based on the three dimensional maps collected by the LiDAR. For example, based on patterns of pulsed laser lights reflected off from the road, the perception engine 304 may determine that the road ahead has an inclination.

In some embodiments, the decision engine 306 can be configured to make driving decisions for an autonomous vehicle. The decision engine 306 can interface with the perception engine 304 to acquire information regarding objects in the environment and, in some cases, surface imperfections of roads. The decision engine 306, based on information received from the perception engine 304, can determine a next action or a next series of actions for the autonomous vehicle. For example, the perception engine 304 detects a traffic light transitions from a green to a yellow light. The decision engine 306, based on this information, decides that the next action for the autonomous vehicle is to slowdown and eventually come to a stop. In another example, the perception engine 304 detects a pothole at some distance ahead. Further, the perception engine 304 determines that neighboring lanes are clear of moving vehicles. In this example, the decision engine 306 may instruct the autonomous vehicle to change lanes instead of staying on course.

In some embodiments, the decision engine 306 may access high definition maps from the data store 320 to help make driving decisions. The high definition maps can be used by the decision engine 306 to identify in advance surface imperfections on roads. In general, the high definition maps may contain detailed information about the surface imperfections. For example, the high definition maps may contain information regarding sizes of the surface imperfections. In another example, the high definition maps may contain location information (e.g., GPS coordinates) associated with the surface imperfections. In yet another example, the high definition maps may contain inclination or declination information about the roads. In some embodiments, the decision engine 306 may use the detailed information form the high definition maps to augment information received from the perception engine 304. For example, based on the detailed data in the high definition maps, the decision engine 306 anticipates a pothole or a sinkhole of a certain size, at about a mile ahead. In this example, if traffic condition is light, the decision engine 306 may relay to the control engine 308 to direct the autonomous vehicle to change lanes so the pothole or the sinkhole can be avoided. However, if the traffic condition is heavy and not conducive to lane changes, the decision engine 306 may decide to stay in its current lane. Moreover, in this example, at some time later, the perception engine 302 detects that the pothole at 100 feet ahead. Here, the decision engine 302 may relay to the control engine 308 to direct the autonomous vehicle to accelerate or decelerate prior to reaching the pothole, thereby, reducing any disturbance to passengers.

In another example, the surface imperfection includes an elevation which has an uphill portion followed by a downhill portion. The perception engine 304 can detect the elevation before the vehicle arrives at it. Estimating what is needed to maintain the desired speed of the vehicle claiming the uphill, the decision engine 306 may decide to increase the speed of the vehicle, perhaps only slightly to comport to requirement of traffic law and ensure comfort of the passenger, so that the vehicle may benefit from the momentum. Alternatively, the decision engine 306 may instruct the vehicle to change to a lower gear if one is employed in the vehicle. Conversely, prior to entering into the downhill portion, the decision engine 360 may cause the vehicle to slow down gradually to avoid sudden brake or deacceleration.

In some embodiments, the control engine 308 can be utilized to effectuate a change to an autonomous vehicle based on instructions received from the decision engine 306. As discussed, the control engine 308 can be implemented as a feedforward control augmented with a feedback control. For example, if a next action from the decision engine 306 is to accelerate, the control engine 308, using the feedforward control, can output control signals to actuators of the autonomous vehicle to cause acceleration before waiting for the feedback control to take action. In this example, the control engine 308 may output a control signal to an actuator that depresses an acceleration pedal of the autonomous vehicle to cause the acceleration. In another example, if the next action from the decision engine 306 is to change from one lane to another lane, the control engine 308 can output a control signal to an actuator to move front wheels of the autonomous vehicle. Although in FIG. 3A, only one control engine (e.g., the control engine 308) is depicted, the preemptive control engine 302 is not limited to just one control engine. In some embodiments, the preemptive control engine 302 can include a plurality of control engines. For example, there can be two control engines to control speeds of the autonomous vehicle. One control engine dedicated to controlling acceleration of the autonomous vehicle and another control engine dedicated to controlling braking of the autonomous vehicle. Many variations are possible. Details of the control engine 308 are further discussed herein with respect to FIG. 3B.

Figure 3B:
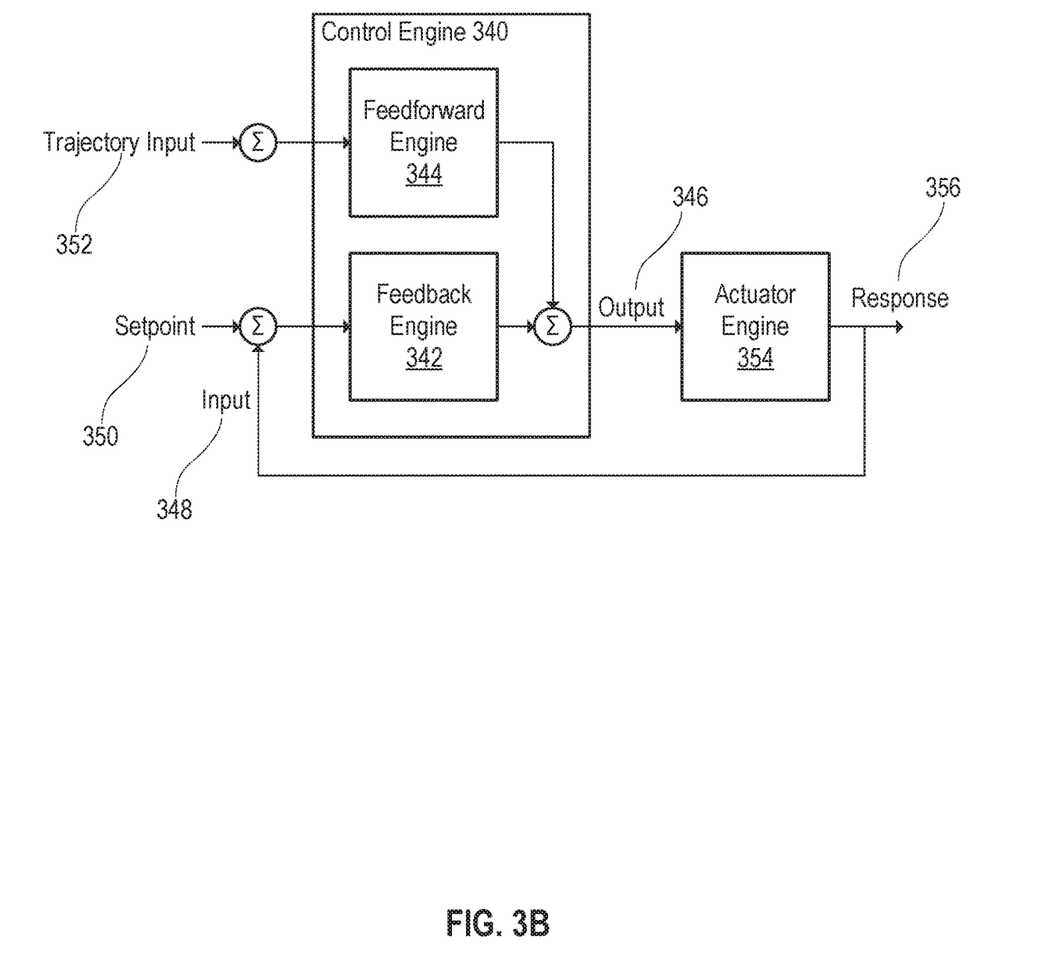
FIG. 3B illustrates an example control engine, according to an embodiment of the present disclosure.

FIG. 3B illustrates an example control engine 340, according to an embodiment of the present disclosure. In some embodiments, the control engine 340 can be implemented as machine-readable instructions embedded in an instruction engine of a control module (e.g., the instruction engine 210 of FIG. 2). In some embodiments, the control engine 308 of FIG. 3A can be implemented as the control engine 340 of FIG. 3B. In various embodiments, the control engine 340 can include a feedback engine 342 and a feedforward engine 344. The feedback engine 342 generally can be implemented as a closed-loop control system for which a response 356 from an actuator engine 354 is looped back as an input 348 to the feedback engine 342. The feedback engine 342 determines a difference (or an error) between a setpoint 350 and the input 348. Based on this difference, the feedback engine 342 generates an output 346 for the actuator engine 354 to act. The actuator engine 354, based on the output 346, causes the response 356 such that the response 356, and thus the input 348, equals to the setpoint 350. For example, as discussed, the feedback engine 342 can be implemented to control speeds of an autonomous vehicle. In this example, the setpoint 350 can be a speed that the autonomous vehicle should comply with (e.g., speed limits posted on roadways). The output 346 can be a control signal to one or more actuators (e.g., the actuator engine 354) that direct the autonomous vehicle to accelerate or decelerate. The input 348 (or the response 356) can be a speed at which the autonomous vehicle is currently traveling or driving. In this example, if the autonomous vehicle is traveling faster or slower than the speed limit, the feedback engine 342 can detect a difference between the speed limit (e.g., the setpoint 350) and the speed the autonomous vehicle is currently traveling (e.g., the input 348 or the response 356). Based on this difference (e.g., an error input to the feedback engine 342), the feedback engine 342 can output one or more control signals (e.g., the output 346) to one or more actuators (e.g., the actuator engine 354) that directs the autonomous vehicle either to accelerate or decelerate until the speed of the autonomous vehicle equals to the speed limit. For instance, the autonomous vehicle travels at 70 miles per hour while the speed limit is 65 miles per hour. In this instance, the feedback engine 342 outputs a signal that causes the autonomous vehicle to slow down until the speed equals to 65 miles per hour. For another instance, the autonomous vehicle travels at 60 miles per hour while the speed limit is 65 miles per hour. In this instance, the feedback engine 342 outputs a signal that causes the autonomous vehicle to accelerate until the speed equals to 65 miles per hour.

In general, the feedback engine 342 is effective at controlling various operations of the autonomous vehicle. However, as discussed, the feedback engine 342 tends to have slow response times. This is because the feedback engine 342 does not respond until the input 348 deviates from the setpoints 350. In such cases, the feedforward engine 344 can be utilized to improve the response times of feedback engine 342. In various embodiments, the feedforward engine 344 can be configured to augment the feedback engine 342 to speed up the response time of the control engine 340. The feedforward engine 344 can estimate the output 346 of the feedback engine 342 without having to wait for the feedback engine 324 to respond or react. For example, an autonomous vehicle travels on a highway at 65 miles per hour. The autonomous vehicle, based on real time three dimensional maps acquired by a LiDAR onboard the autonomous vehicle, determines that at about 100 feet ahead, there is a 30 degree incline on the highway (e.g., trajectory input 352). In this example, if the control engine 340 relies solely on the feedback engine 342, the autonomous vehicle does not respond (e.g., accelerate) until the autonomous vehicle reaches the incline and experiences a decrease in speed. In contrast, the addition of the feedforward engine 344 allows the control engine 340 to react or respond in anticipation of the incline, or preemptively. For instance, here, the feedforward engine 344, as the autonomous vehicle gets closer to the incline, may output a signal that causes the autonomous vehicle to accelerate such that when the autonomous vehicle reaches the incline, the increase in speed due to the acceleration offsets or negates the slowdown caused by the incline.

Figure 4A:
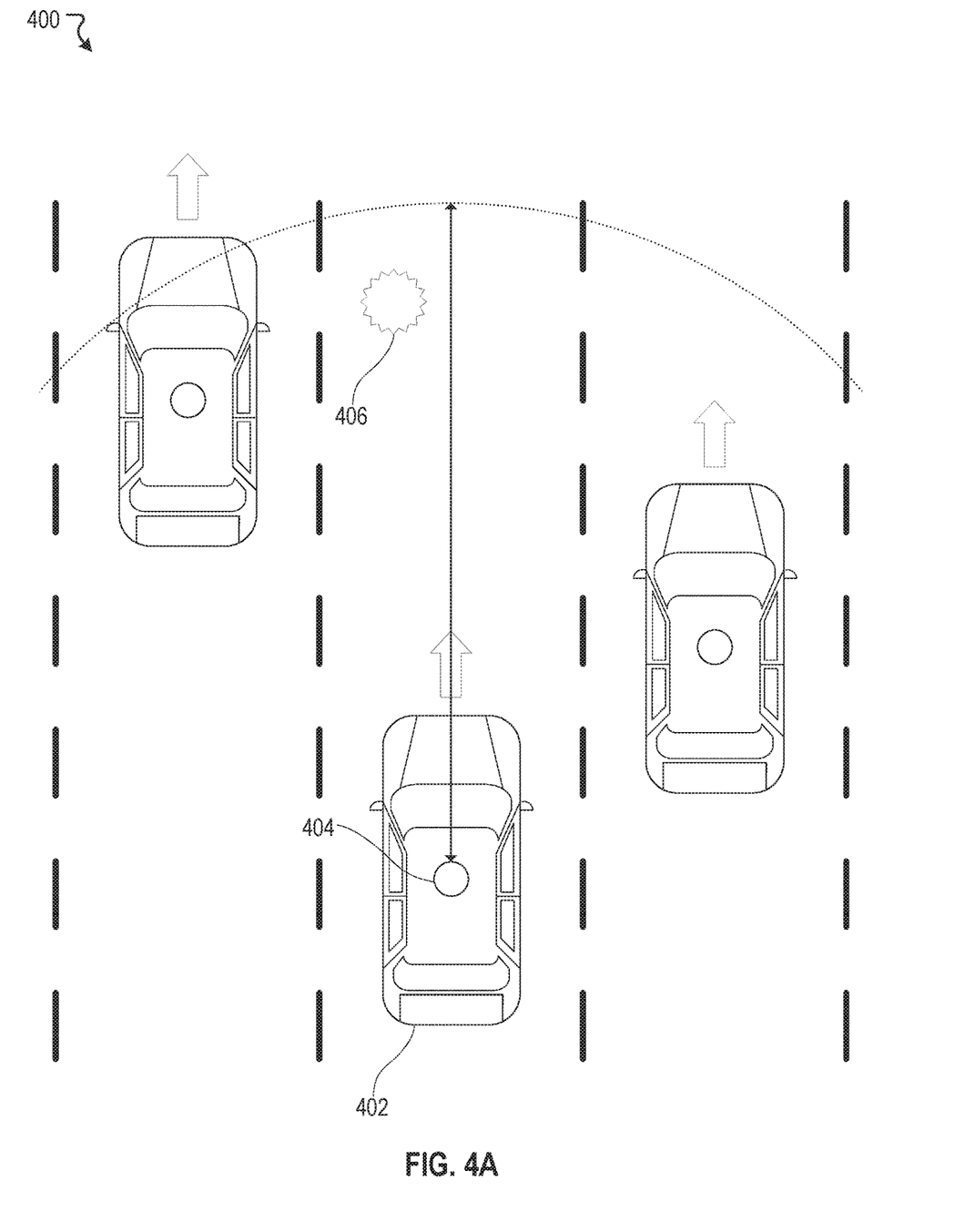
FIGS. 4A-4B illustrate an example scenario of a preemptive control for an autonomous vehicle, according to an embodiment of the present disclosure.
Figure 4B:
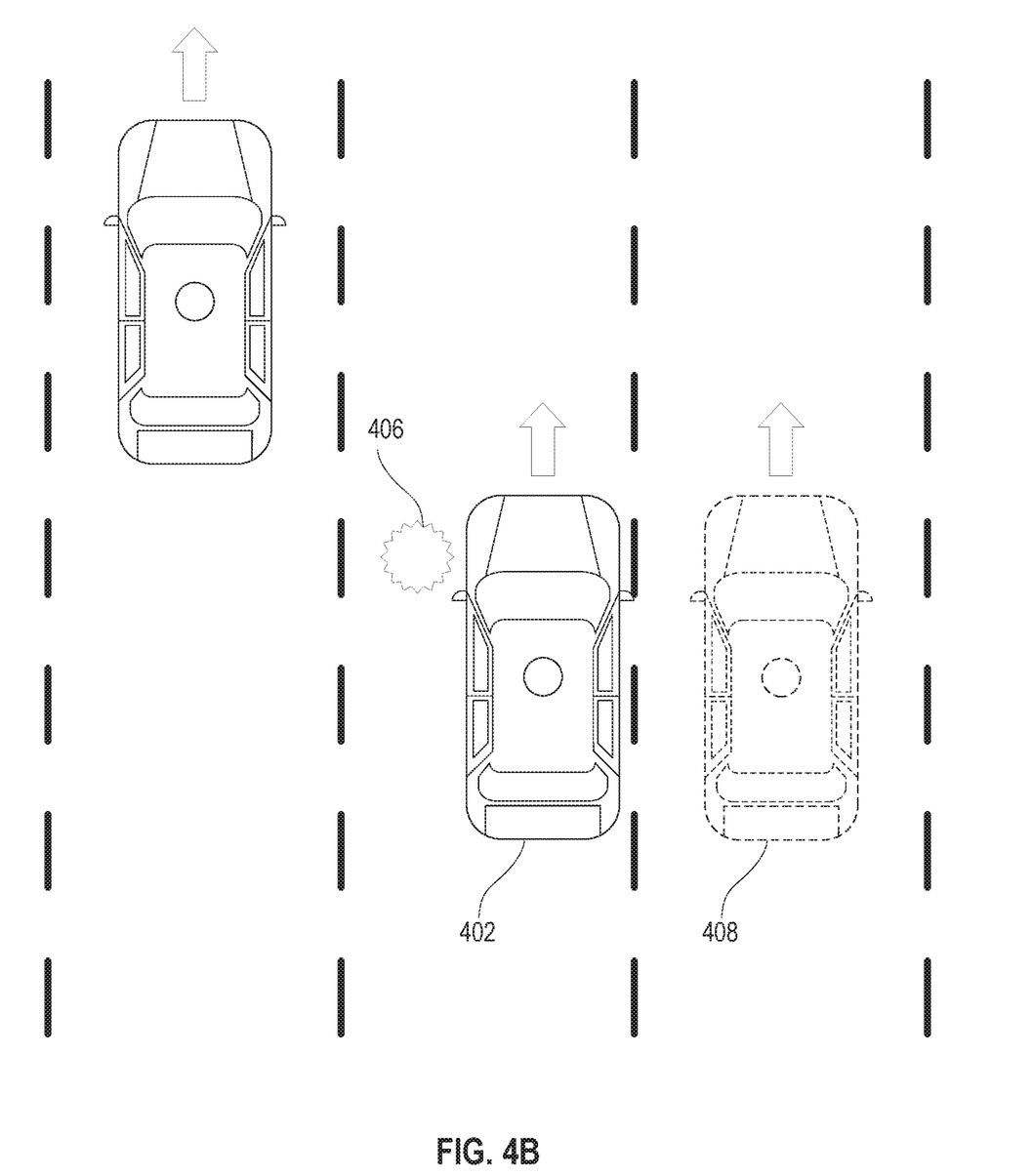

FIGS. 4A-4B illustrate an example scenario 400 of a preemptive control for an autonomous vehicle to improve ride quality, according to an embodiments of the present disclosure. In FIG. 4A, an autonomous vehicle 402 is shown traveling on a center lane of a three-lane road in a forward direction. The autonomous vehicle 402 has a LiDAR 404 mounted to a roof of the autonomous vehicle 402. Among other functions, the LiDAR 404 can be utilized by the autonomous vehicle 402 to detect, identify, and track surface imperfections of the road in an environment. In some embodiments, the autonomous vehicle 402 may have access to the high definition maps through which the autonomous vehicle 402 can use to anticipate upcoming surface imperfections and, if feasible, to circumvent these surface imperfections when circumstances allow. In this example, based on the high definition maps, the autonomous vehicle 402 anticipates a pothole 406 at some distance ahead. At some time later, the LiDAR 404 detects and identifies the pothole 406. In this example, the autonomous vehicle 402 has at least two options as a next action. A first option is to stay on course (e.g., stay on its current lane). A second option is to change lanes if circumstances allow. In the scenario depicted in FIG. 4A, the autonomous vehicle 402 selects the first option. As the autonomous vehicle 402 continues to approach the pothole 406, at a certain point in time, a preemptive control system of the autonomous vehicle 402 may decide to accelerate or decelerate utilizing a feedforward control. The autonomous vehicle's decision to accelerate or decelerate depends on a size of the pothole 406. If the size of the pothole 406 is large, the autonomous vehicle may decelerate to minimize impacts from the pothole 406. If the size of the pothole 406 is small, the autonomous vehicle may accelerate to minimize the impacts from the pothole 406.

In some instances, as depicted in FIG. 4B, if the pothole 406 is off to a side of the center lane, the autonomous vehicle 402 might swivel around the pothole 406 to circumvent rather than to drive through the pothole 406. In this instance, the autonomous vehicle 402 detects the pothole 406 ahead. The autonomous vehicle 402 determines that there are enough room for the autonomous vehicle to swivel around the pothole 406. Under such condition, the autonomous vehicle 402 can drive around the pothole 406. In some cases, if traffic conditions are such that neighboring lanes are clear of moving vehicles, the autonomous vehicle 402 may change lanes to avoid the pothole 406 altogether (e.g., the dotted line vehicle 408).

Figure 5:
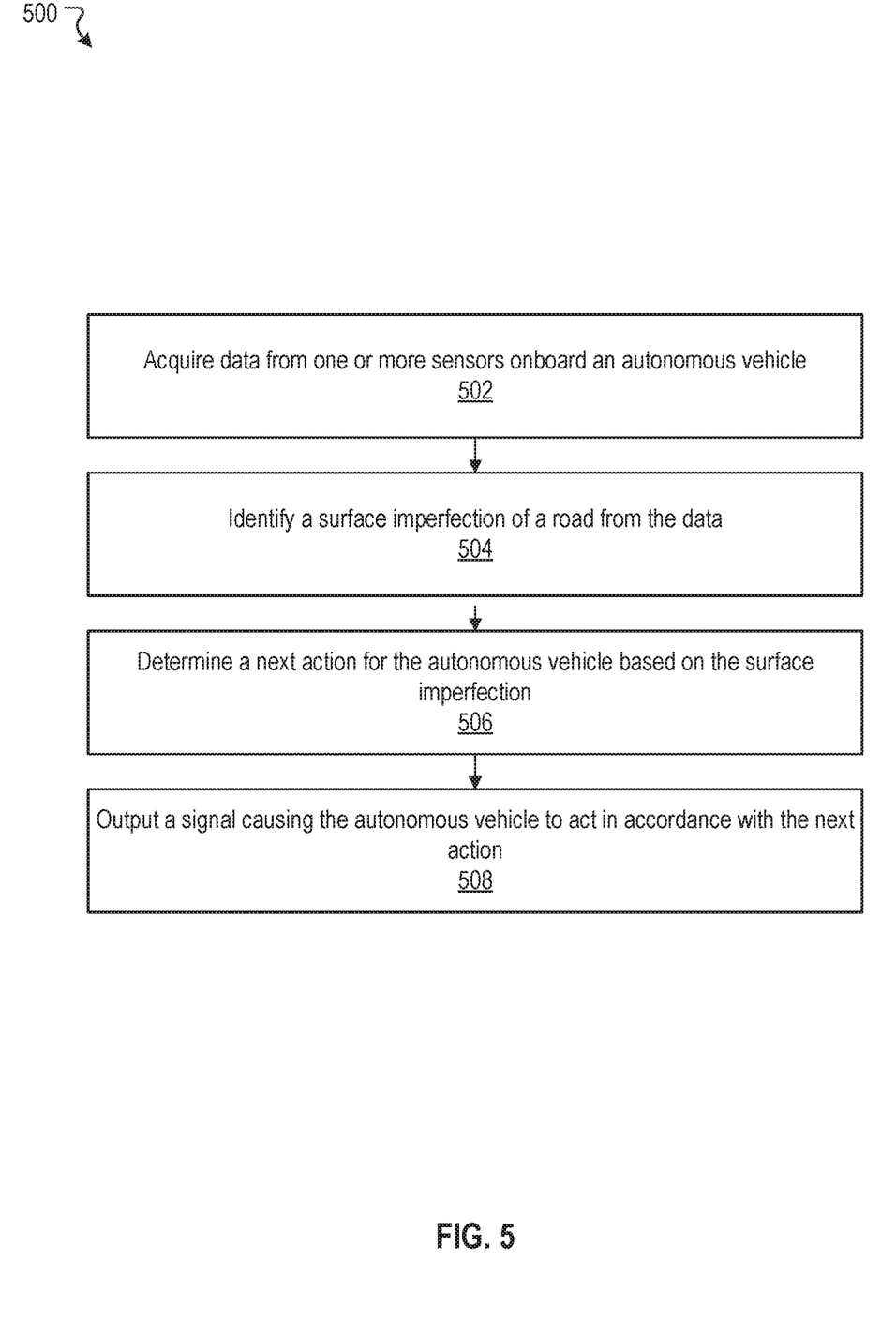
FIG. 5 illustrates an example method, according to an embodiment of the present disclosure.

FIG. 5 illustrates an example method 500, according to an embodiment of the present disclosure. The method 500 may be implemented in various environments including, for example, the example system 300 of FIG. 3A. The operations of method 500 presented below are intended to be illustrative. Depending on the implementation, the example method 500 may include additional, fewer, or alternative steps performed in various orders or in parallel. The example method 500 may be implemented in various computing systems or devices including one or more processors.

At block 502, data from one or more sensors onboard an autonomous vehicle can be acquired. At block 504, a surface imperfection of a road can be identified from the data. At block 506, a next action for the autonomous vehicle can be determined based on the surface imperfection. At block 508, a signal can be outputted causing the autonomous vehicle to act in accordance with the next action.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 6:
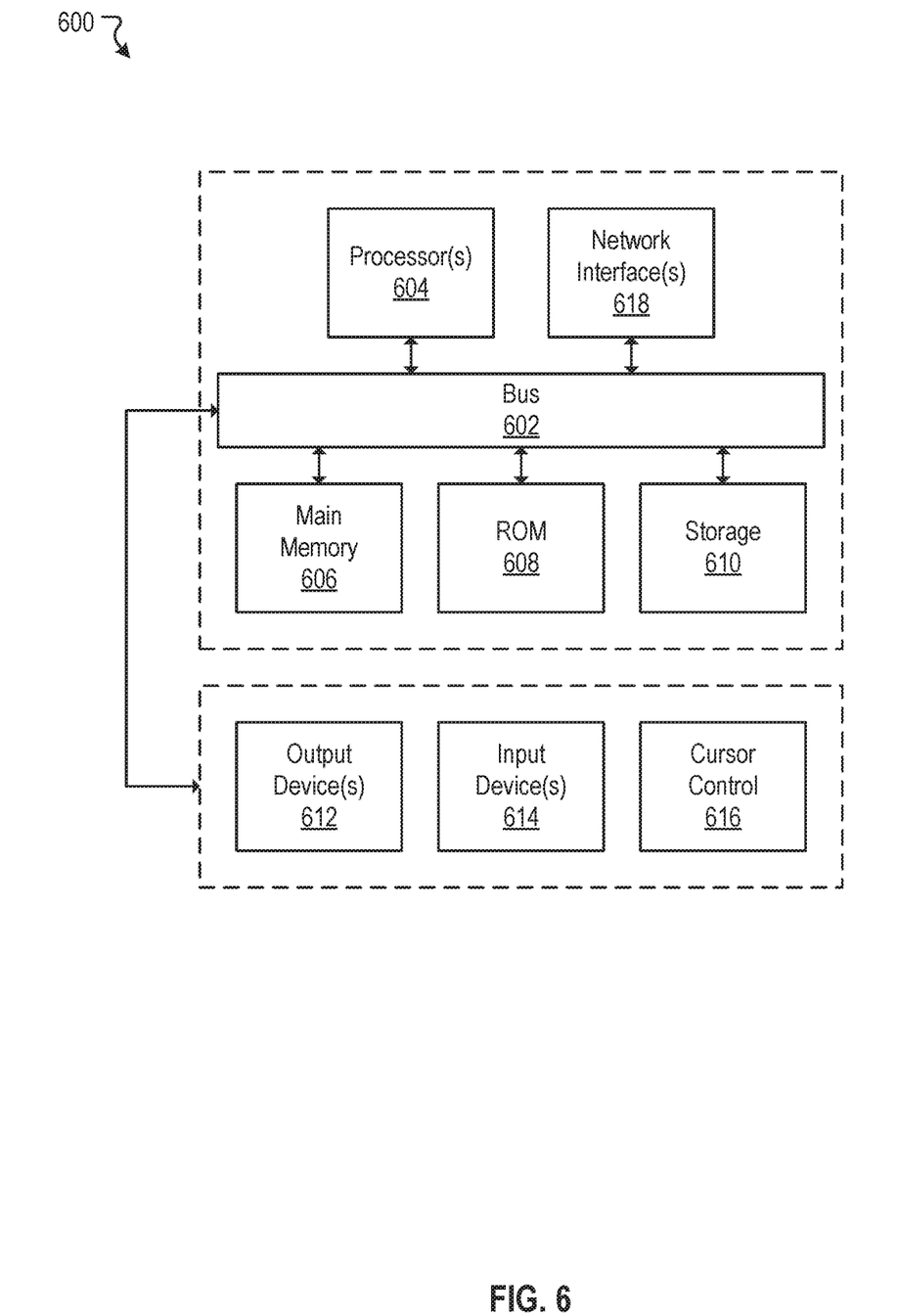
FIG. 6 illustrates a block diagram of a computer system.

FIG. 6 is a block diagram that illustrates a computer system 600 upon which any of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a cathode ray tube (CRT) or LCD display (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

The computer system 600 also includes a communication interface 618 coupled to bus 602. Communication interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicated with a WAN). Wireless links may also be implemented. In any such implementation, communication interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A method for implementing a preemptive control for a vehicle, comprising:
   identifying, from a high definition map, a surface imperfection on a road ahead of the vehicle, and the inclination or declination of the road;
   detecting, from the high definition map, a lane within which the surface imperfection is located, and a neighboring lane;
   acquiring a traffic condition on the neighboring lane;
   changing to the neighboring lane when the traffic condition allows, or staying in the lane and acquiring data from one or more sensors onboard the vehicle;
   detecting a size of the surface imperfection from the data; and
   determining the next action based on the size of the surface imperfection, and inclination or declination of the road, wherein the next action comprises decelerating the vehicle if the size of the surface imperfection exceeds a threshold size or accelerating the vehicle if the size of the surface imperfection is below the threshold size, to a speed according to the inclination or declination to reduce disturbance caused by the surface imperfection.

2. The method of claim 1, wherein determining the size of the surface imperfection further comprises:
   analyzing data acquired from a LiDAR corresponding to the surface imperfection; and
   determining the size of the surface imperfection based on the data acquired from the LiDAR.

3. The method of claim 1, wherein the traffic condition of the neighboring lane is acquired by
   utilizing one or more radars to detect presence of moving vehicles in the neighboring lane.

4. The method of claim 1, wherein the preemptive control system is a feedforward control augmented with a feedback control.

5. The method of claim 1, wherein the one or more sensors onboard the vehicle include one or more LiDARs, one or more radars, and one or more cameras.

6. The method of claim 1, wherein the surface imperfection of the road includes at least one of a pothole, a sinkhole, or an uneven pavement.

7. A computing system for implementing a preemptive control for an vehicle to improve ride quality comprising:
   one or more processors; and
   a memory storing instructions that, when executed by the one or more processor, causes the system to perform:
      identifying, from a high definition map, a surface imperfection on a road ahead of the vehicle, and the inclination or declination of the road;
      detecting, from the high definition map, a lane within which the surface imperfection is located, and a neighboring lane;
      acquiring a traffic condition on the neighboring lane;
      changing to the neighboring lane when the traffic condition allows, or staying in the lane and acquiring data from one or more sensors onboard the vehicle;
      detecting a size of the surface imperfection from the data; and
      determining the next action based on the size of the surface imperfection, and inclination or declination of the road, wherein the next action comprises decelerating the vehicle if the size of the surface imperfection exceeds a threshold size or accelerating the vehicle if the size of the surface imperfection is below the threshold size, to a speed according to the inclination or declination to reduce disturbance caused by the surface imperfection.

8. The computing system of claim 7, wherein the one or more sensors onboard the vehicle include one or more LiDARs, one or more radars, and one or more cameras.

9. The computing system of claim 7, wherein the surface imperfection of the road includes at least one of a pothole, a sinkhole, or an uneven pavement.

10. A non-transitory computer readable medium comprising instructions that, when executed, cause one or more processors to perform:
    identifying, from a high definition map, a surface imperfection on a road ahead of the vehicle, and the inclination or declination of the road;
    detecting, from the high definition map, a lane within which the surface imperfection is located, and a neighboring lane;
    acquiring a traffic condition on the neighboring lane;
    changing to the neighboring lane when the traffic condition allows, or staying in the lane and acquiring data from one or more sensors onboard the vehicle;
    detecting a size of the surface imperfection from the data; and
    determining the next action based on the size of the surface imperfection, and inclination or declination of the road, wherein the next action comprises decelerating the vehicle if the size of the surface imperfection exceeds a threshold size or accelerating the vehicle if the size of the surface imperfection is below the threshold size, to a speed according to the inclination or declination to reduce disturbance caused by the surface imperfection.

11. The non-transitory computer readable medium of claim 10, wherein the one or more sensors onboard the vehicle include one or more LiDARs, one or more radars, and one or more cameras.

12. The non-transitory computer readable medium of claim 10, wherein the surface imperfection of the road includes at least one of a pothole, a sinkhole, or an uneven pavement.

* * * * *